United States Patent [19]

De Laporte

[11] Patent Number: 5,128,167
[45] Date of Patent: Jul. 7, 1992

[54] COMPOSITION FOR THE PREPARATION OF ARTIFICIAL CALF MILK AND ARTIFICIAL CALF MILK PREPARED THEREFROM

[75] Inventor: Andre H. J. De Laporte, De Pinte, Belgium

[73] Assignee: Amylum, naamloze vennootschap, Brussels, Belgium

[21] Appl. No.: 668,093

[22] Filed: Mar. 12, 1991

[30] Foreign Application Priority Data

Mar. 13, 1990 [BE] Belgium ............................. 09000283

[51] Int. Cl.⁵ .............................................. A23C 23/00
[52] U.S. Cl. .................................... 426/580; 426/588; 426/602; 426/807; 426/2
[58] Field of Search ................... 426/2, 588, 602, 807, 426/580

[56] References Cited

U.S. PATENT DOCUMENTS

| | | | |
|---|---|---|---|
| 4,132,808 | 1/1979 | Kakade | 426/2 |
| 4,391,839 | 7/1983 | Devenyi et al. | 426/626 |
| 4,418,091 | 11/1983 | Glas | 426/2 |
| 4,600,585 | 7/1986 | Vitcenda | 426/2 |
| 4,614,653 | 9/1986 | Kakade | 426/2 |
| 4,692,338 | 9/1987 | Irvine | 426/2 |
| 4,857,338 | 8/1989 | Ybema | 426/2 |
| 4,961,934 | 10/1990 | Iwasaki | 426/2 |
| 5,008,248 | 4/1991 | Bywater | 426/2 |

FOREIGN PATENT DOCUMENTS

| | | |
|---|---|---|
| 0162805 | 11/1985 | European Pat. Off. . |
| 164929 | 12/1985 | European Pat. Off. . |
| 835545 | 5/1960 | United Kingdom . |
| 1519164 | 7/1978 | United Kingdom . |
| 2066043 | 7/1981 | United Kingdom . |

OTHER PUBLICATIONS

6001 Chemical Abstracts, 107(1987) Jul., No. 1, p. 563, "Manufacture of Milk Substitutes Using Colloidal Systems."
Commonwealth Agr. Bur., Document No. 0ON0O5-1-043600; Nutrition ABS and Rev/Ser B. Enzyme Hydrolysates of Plant Feeds as Components of Milk Replacers for Young Male Cattle.
Derwent File Supplier; 81-58333D; 1981; Milk Substitute for Young Farm Animals-Containing Skimmed Milk Powder, Fermented Gluten and Maize Extract Hydrolysate, Premix, Fat and Phosphatide Concentrate.
J. L. Troccon, R. Toullec, "Aliments d'allaitement pour veaux d'élevage," INRA Prod. Anim., 1989, 2 (2), 117-128.

*Primary Examiner*—Carolyn Paden
*Attorney, Agent, or Firm*—Foley & Lardner

[57] ABSTRACT

Composition for the preparation of artificial calf milk, which composition in addition to carbohydrates, also contains lactoproteins, vegetable protein and fat, characterized in that at least one part of the vegetable protein consists of soluble wheat protein.

19 Claims, No Drawings

COMPOSITION FOR THE PREPARATION OF ARTIFICIAL CALF MILK AND ARTIFICIAL CALF MILK PREPARED THEREFROM

BACKGROUND OF THE INVENTION

The invention relates to a composition for the preparation of artificial calf milk, which composition in addition to carbohydrates, also contains lactoproteins, vegetable protein and fat.

Such compositions were already developed due to the increasing shortage of skimmed milk powder that in the present artificial calf milk compositions usually forms the source of the lactoproteins. These present compositions have in addition to skimmed milk powder, a vegetable or animal fat that replaces the expensive butter fat. Thought has been given to partially or wholly replacing the skimmed milk powder by other products derived from by-products from the milk industry. Such by-products are whey powder, lactose-poor whey powder or protein-rich whey powder, caseinate, and whey-protein concentrate. Here there are also sometimes problems relating to the supply or the quality of the product.

For this reason efforts have been made to partially or wholly replace the skimmed milk powder or the lactoproteins in general by other proteins. From there that an extensive series of vegetable and animal proteins, which are suitable for replacing the lactoproteins and more especially those derived from the skimmed milk powder in a artificial calf milk composition, have been described in literature. Such proteins are: fish protein, potato protein, soya concentrate and isolate, alfalfa protein concentrate and proteins derived from leguminosae.

All these replacement proteins show one or several disadvantages in relation to the lactoprotein. These disadvantages are, among others, a limited solubility. When the composition is placed in water for the formation of the artificial calf milk an unstable suspension is obtained. This problem can only be solved by adding expensive stabilizers. With the utilization of soya proteins the presence of anti-nutritional factors leads to diarrhea, decreased digestibility and increased intestinal wall permeability.

The relatively high iron content in certain proteins is disadvantageous with the feeding of fattening calves since they give the veal a darker color and white veal is favored by the consumer.

The digestibility of vegetable proteins is clearly lower than that of lactoproteins such as those which are derived from milk powder and whey powder. Thus the digestibility of soya concentrate amounts to 70–88%, of potato protein 82% and of partially hydrolyzed corn proteins 86%. These values are valid for calves of between four and fifteen weeks. For these calves the lactoprotein digestibility amounts to 94–98%. Replacement of lactoprotein by other proteins until now lead to a reduction in weight increase of the calves. This weight increase varied with the age of the animals but also with the percentage of lactoprotein that was replaced. Thus with utilization of soya protein that replaced 33% of the lactoprotein, weight increases were recorded which were 10 to 20% lower than when all protein consisted of lactoprotein.

It is further known that these replacement proteins do not coagulate or block in the fourth stomach, as is the case with lactoprotein. This leads to an accelerated evacuation from the gastrointestinal tract of both the protein and the fat and therefore to a reduced digestibility and decreased growth.

It was in general recorded that the negative influence on the growth of the animals becomes significant, when the replacement protein reaches 25 to 50 weight-% of the total protein present. This value is dependent upon the nature of the protein and upon the technological treatment to which it has been subjected. The utilization of these replacement proteins is extensively discussed by J. L. Troccon and R. Toullec in INRA Prod. Anim. 1989,2(2), 117–128.

SUMMARY OF THE INVENTION

The purpose of the invention is to remedy these disadvantages and to provide a composition for the preparation of artificial calf milk whereby a part of the lactoprotein is replaced by vegetable protein but which nevertheless almost has the same good characteristics as a composition whereby practically all protein is provided by lactoprotein.

For this purpose at least a part of the vegetable protein consists of soluble wheat protein.

DESCRIPTION OF THE PREFERRED EMBODIMENTS

It was surprisingly recorded that by utilizing partially or preferably principally soluble wheat protein (SWP) as vegetable protein the above described disadvantages which are obtained by utilizing other vegetable proteins appear to a lesser degree or even not at all.

In a particular embodiment of the invention the composition contains 1–25 weight-% soluble wheat protein, calculated on the total.

In a suitable embodiment of the invention the lactoproteins are at least partially derived from whey powder.

The composition preferably contains 10–60 weight-% whey powder, calculated on the total.

In another particular embodiment of the invention the composition contains 15 to 23 weight-% fat, calculated on the total.

The invention also relates to a artificial calf milk prepared by the composition according to one of the above described embodiments to be emulsified in water.

In particular the invention relates to a artificial calf milk which consists of an emulsion of 125 to 175 grams of the composition per liter emulsion.

In order to show better the characteristics according to the present invention, some preferred embodiments of a composition for the preparation of artificial calf milk according to the invention are described hereafter, as examples and without any restrictive character.

The composition for the preparation of artificial calf milk according to the invention contains in addition to carbohydrates principally derived from whey powder and possibly skimmed milk powder, lactoproteins wholly or partially derived from whey powder and possibly skimmed milk powder, vegetable protein that is principally formed by soluble wheat protein, and fat.

The soluble wheat protein is obtained from wheat gluten and is characterized by a practically complete cold water solubility and a good emulsifying capacity. Methods for the preparation of such soluble wheat protein were already described in literature.

The content of soluble wheat protein in the composition can vary between 5 and 90 weight-% calculated on the total protein. The remaining protein is principally derived from whey powder and possibly skimmed milk powder. The protein derived from the skimmed milk powder is preferably first replaced by the soluble wheat protein so that with sufficient wheat protein the composition even contains no skimmed milk powder.

The total amount of soluble wheat protein lies between 1 and 25 weight-% and preferably between 8 and 20 weight-% of the total weight of the composition. The lactoproteins are derived from whey powder that usually contains approximately 12 weight-% protein and possible from skimmed milk powder that usually contains approximately 23 weight-% protein. The composition contains, namely 10 to 60 weight-%, calculated on the total weight of the composition, whey powder and an amount of skimmed milk powder which is situated between 0 and 60 weight-% calculated on the total weight of the composition. The composition preferably contains 40 to 60 weight-% whey powder and no skimmed milk powder.

The composition can, in addition to lactoprotein and the soluble wheat protein, contain a small amount of other protein, namely 0 to 10 weight-%, calculated on the total composition, vegetable or animal protein. As vegetable protein that can be added in limited quantity are suitable: soya concentrate or isolate, potato protein, protein derived from leguminosae or oleaginous seeds and corn protein. As animal protein fish protein, whether or not hydrolyzed, can be utilized.

The amount of fat in the composition preferably amounts to almost 20 weight-% calculated on the total weight of the composition. This fat can be both of vegetable and animal origin or consist of a mixture of vegetable and animal fats. Animal fats which can be utilized with this are homogenized and emulsified beef or pork fat. The fat can also be derived from a skimmed milk powder fat core or a whey powder fat core which contain a part of fat. Vegetable fat that can be utilized is among others palm kernel oil or coconut oil.

The composition usually also contains a number of additives such as carbohydrates, synthetic essential amino acids, minerals and vitamins added and therefore not derived from the whey powder or the skimmed milk powder.

The amount of added carbohydrates amounts to 0 to 12 weight-%. Suitable carbohydrates are starch, lactose and dextrose or a mixture thereof.

The amount of synthetic essential amino acids amounts to 0 to 3 weight-%. These amino acids ensure that the amino acid composition of the artificial milk shows the necessary balance. Typical amino acids which can be added are: lysine, threonine, methionine, histidine and tryptophan.

The amounts of vitamins and minerals, available together on the market as a premix, amount to 2 to 5 weight-%. Such premixes are general known to the specialist. They usually contain calcium, chalk, trace elements such as copper manganese, zinc, cobalt together with vitamins such as vitamin E, vitamin B2, vitamin C etc.

A typical composition according to the invention is for example the following:
skimmed milk powder: 0-60%
whey powder: 10-60%
vegetable or animal protein: 0-10%
soluble wheat protein: 1-20%
fat: 15-23%
added carbohydrates: 0-12%
synthetic essential amino acids: 0-3%
minerals and vitamins: 2-5%

A preferable composition according to the invention is the following:
whey powder: 40-60%
fat: 15-23%
soluble wheat protein: 8-20%
vegetable or animal protein: 0-7%
added carbohydrates: 1-13%
synthetic essential amino acids: 1-2%
minerals and vitamins: 2-5%

All percentages are weight percentages.

The artificial calf milk composition is given to calves in the form of an emulsion in water. The emulsion preferably contains 125 to 175 g of composition per liter of emulsion.

Artificial calf milk on the basis of compositions according to the invention have been examined from the various disadvantageous facets which appear with the incorporation of vegetable or animal proteins.

The solubility of the wheat protein utilized according to the invention is excellent and practically no precipitation of material was recorded after an hour standing of the calf milk.

The absence of anti-nutritional factors reveals itself among others in a normal faecal excretion and composition and in a normal drinking behavior.

The iron content and the iron absorption are low, both with compositions on the basis of soluble wheat protein and with compositions which only contain lactoprotein. This is illustrated by the hemoglobin content in the blood of test animals during growing tests. At the end of the growing test, after a life of 26 weeks the hemoglobin content amounted to 5.2 mmol/l with the test group which was fed with an emulsion of skimmed milk powder, and 5.3 mmol/l with the test group where the milk powder was replaced by a mixture of whey powder and soluble wheat protein.

Digestibility tests, performed with artificial calf milk on the basis of compositions which contain increasing amounts of soluble wheat protein showed no considerable difference with regard to to protein and fat digestibility with artificial milk on the basis of compositions which only contain lactoproteins. The protein digestibility of the wheat protein and of the lactoprotein varied between 94-98%. This is clearly higher than the values which were mentioned for other vegetable proteins in the literature.

During growing tests the average weight increase was examined at the same time, in function of the amount of vegetable protein present in the feed composition. Furthermore the weight increase appears to differ slightly from that when fed only with an emulsion of skimmed milk powder. During tests whereby 30% of the protein present consists of soluble wheat protein, the average weight increase was 9% higher. With tests whereby 50% of the protein present in the composition consists of soluble wheat protein, the average weight increase was 3% lower. In a third test 90% of the protein present consisted of soluble wheat protein. The average weight increase was here 3 to 5% lower in comparison to the reference.

All these values are significantly higher than the values which were obtained with other vegetable or animal substitution proteins. From the figures mentioned it also appears that when very large amounts of wheat protein were utilized no negative influence was recorded in the growth of the animals, this in contrast to what the state-of-the-art teaches us.

After slaughtering the animals which were fed with an artificial calf milk prepared with a composition which contains 90% soluble wheat protein on the total protein, no significant differences appeared to exist with the reference animals, regarding meat color, meatiness and fat layer.

An important characteristic of the soluble wheat protein, is the coagulating capacity, whereby this protein will form a protein flake at its isoelectric point. This flake corresponds to the rennet that arises with the precipitation of lactoprotein at its isoelectric point (acid coagulation). It is therefore supposed that the good digestibility of the wheat protein utilized according to the invention is strongly connected to this characteristic. As appears from the state-of-the-art, the known substitution proteins cannot provoke coagulation in the fourth stomach.

The invention will be further clarified on the basis of the following examples:

EXAMPLES 1 THROUGH 3

Artificial calf milk was made by preparing three emulsions in water of 125 grams (composition) per liter emulsion of respectively the following three artificial calf milk compositions (table 1) hereafter called feed 1, feed 2, and feed 3, whereby the composition feed 1 is given as reference and in contrast to the others, is not according to the invention.

TABLE 1

| | Feeds | | |
|---|---|---|---|
| Ingredient | Feed 1 | Feed 2 | Feed 3 |
| Skimmed milk powder fat core | 53.03 | 47.73 | 42.42 |
| Skimmed milk powder | 24.47 | 22.02 | 19.58 |
| Whey powder | 10.00 | 9.00 | 8.00 |
| Soluble wheat protein (SWP) | — | 10.00 | 20.00 |
| Dextrose | 4.10 | 3.69 | 3.28 |
| Lactose | 5.00 | 4.50 | 4.00 |
| Starched starch | 2.00 | 1.80 | 1.60 |
| Chalk | 0.15 | 0.135 | 1.12 |
| Premix | 1.25 | 1.125 | 1.00 |

Skimmed milk powder fat core: contains 33% fat and 67% milk powder.
Protein content of the skimmed milk powder amounts to 23.18% (N×6.25)
Whey powder: protein content amounts to 12.64% (N×6.25)
Soluble wheat protein (SWP): protein content amounts to 85.0% in dry substance (N×6.25). N is the nitrogen content.

The average apparent digestibility of three artificial calf milks on the basis of these three feeds was determined on fifteen bull calves (FH×HF).

The determination of the average apparent digestibility was performed via procedures which are generally known by the specialist.

The average apparent digestibility coefficient and standard deviation of the average of the protein fraction in the various feeds and for the protein fraction of soluble wheat protein separately (SWP) in feed 2 and 3 are shown in table 2.

TABLE 2

| | Digestibility Coefficient. |
|---|---|
| Feed 1 | 94.1 ± 1.0 |
| Feed 2 | 95.3 ± 1.1 |
| Feed 3 | 94.9 ± 1.6 |
| SWP in feed 2 | 98.2 ± 2.0 |

TABLE 2-continued

| | Digestibility Coefficient. |
|---|---|
| SWP in feed 3 | 95.7 ± 1.6 |

The very good digestibility of the soluble wheat protein clearly appears from these values.

EXAMPLES 4 THROUGH 6

Three emulsions in water were prepared from 125 g/l emulsion from respectively the three following artificial calf milk composition, called feed 4, feed 5 and feed 6 (table 3). Feed 4 was given as reference and is, in contrast to feeds 5 and 6, not according to the invention.

TABLE 3

| Ingredients | Feed 4 | Feed 5 | Feed 6 |
|---|---|---|---|
| Skimmed milk powder fat core | 85.50 | — | — |
| Whey powder fat core | — | 71.40 | 68.75 |
| Soluble wheat protein | — | 20.00 | 13.40 |
| Soya concentrate | — | — | 7.65 |
| Fat | 1.20 | 4.40 | 6.34 |
| Lactose | 12.30 | 0.01 | — |
| Premix | 1.00 | 1.00 | 1.00 |
| L-Lysine HCl | — | 1.28 | 1.07 |
| L-Threonine | — | 0.16 | 0.14 |
| Chalk | — | 0.30 | 0.40 |
| Phosphoric chalk | — | 1.20 | 1.00 |
| CaCl2.2H20 | — | 0.25 | 0.25 |

Skimmed milk powder fat core: 77.5% skimmed milk powder, 2.5% starch, and 20% fat.
Whey powder fat core: 80% whey powder and 20% fat.
Composition of the fat in milk powder and whey powder: 30.33% beef fat, 30.33% lard, 30.33% palm kernel oil, 6.00% lecithin, 2.00% synthetic emulsifier and 1.00% lard-BHT mixture.
Composition of the other fat: 47.33% lard, 14% beef fat, 30% coconut oil, 8.33% lecithin and 0.33% synthetic emulsifier.

Emulsions from these feeds were given to 60 Frisian bull calves (FM×MF).

During a comparative growth period the following observations were made:

The live weight and the hemoglobin content of the blood were determined in the fattening period (period of 6-26 weeks) this on week 6, 8, 10, 12, 14, 18, 22 and 26.

Per feeding the feeding intake was determined per animal.

After each weighing the food conversion and the weight increase was calculated per animal.

After slaughtering of the calves meatiness, fat layer and meat color of the carcasses were judged according to the EUROP-system.

The average cumulative weight increase (g/day and in terms of percentage in relation to the reference) of the calves per group is shown hereunder in table 4:

TABLE 4

| | Group | | | | | |
|---|---|---|---|---|---|---|
| | Feed 1 (ref) | | Feed 2 | | Feed 3 | |
| Period (weeks) | g/day | % | g/day | % | g/day | % |
| 6-8 | 1056 | 100 | 1143 | 108 | 1132 | 107 |
| 6-10 | 1088 | 100 | 1111 | 102 | 1125 | 103 |
| 6-12 | 1176 | 100 | 1178 | 100 | 1180 | 100 |
| 6-14 | 1182 | 100 | 1170 | 99 | 1170 | 99 |
| 6-18 | 1197 | 100 | 1165 | 97 | 1160 | 97 |
| 6-22 | 1213 | 100 | 1153 | 95 | 1162 | 96 |

TABLE 4-continued

| Period (weeks) | Group | | | | | |
|---|---|---|---|---|---|---|
| | Feed 1 (ref) | | Feed 2 | | Feed 3 | |
| | g/day | % | g/day | % | g/day | % |
| 6-26 | 1235 | 100 | 1175 | 95 | 1171 | 95 |

From that it appears that the groups which were fed with a milk prepared from a composition on the basis of whey powder and soluble wheat protein, or a mixture of soluble wheat powder and soya concentrate, show a comparative cumulative weight increase. The cumulative weight increase for the reference is higher. This trend however only continues after the 18th week. Between the 6th and the 18th week the difference in weight increase is very small between the various groups.

The hemoglobin content (mmol/l) was measured during the growth period at various points in time. These results are shown in the following table 5:

TABLE 5

| Point in time after x weeks | Group | | | | | |
|---|---|---|---|---|---|---|
| | Feed 4 | | Feed 5 | | Feed 6 | |
| | mmol/l | % | mmol/l | % | mmol/l | % |
| 6 | 6.9 | 100 | 6.8 | 99 | 6.9 | 100 |
| 8 | 6.5 | 100 | 6.4 | 98 | 6.3 | 97 |
| 10 | 6.2 | 100 | 5.9 | 95 | 6.1 | 98 |
| 14 | 5.2 | 100 | 5.1 | 98 | 5.2 | 100 |
| 18 | 5.4 | 100 | 5.5 | 102 | 5.5 | 102 |
| 22 | 5.8 | 100 | 5.8 | 100 | 5.9 | 102 |
| 26 | 5.2 | 100 | 5.3 | 102 | 5.5 | 106 |

The hemoglobin content with calves fed with milk on the basis of feeds 5 and 6 is barely higher than with milk on the basis of the reference feed (feed 4). It is striking that the end value for the mixture wheat protein soya is nevertheless higher, although lower than expected. From this test it therefore appears clearly that there is a low availability of iron in artificial milk with soluble wheat protein. The slaughter return, being the ratio of carcass weight against live weight expressed in %, for the three groups amounted respectively to 61% for feed 4, 59.9% for feed 5 and 59.6% for feed 6.

After slaughtering of the animals the carcasses were judged on meat color, meatiness, and fat layer. Per class was indicated which percentage of carcasses per group falls into this class. These results are shown in the following table 6.

TABLE 6

| Group class | Meat Color | | | Meatiness | | | Fat Layer | | |
|---|---|---|---|---|---|---|---|---|---|
| | 3 | 4 | 5 | R | O | P | 1 | 2 | 3 |
| Feed 4 | 11 | 79 | 11 | 11 | 74 | 16 | 5 | 26 | 68 |
| Feed 5 | 11 | 72 | 17 | 0 | 67 | 33 | 0 | 61 | 39 |
| Feed 6 | 20 | 60 | 20 | 0 | 40 | 60 | 10 | 15 | 75 |

Meat color
1 = white to
5 = red.
Meatiness
R = good
O = moderate
P = bad.
Fat layer
1 = little.
5 = very heavily fatted.

These results can in general be considered as comparable as to quality. Nevertheless there is a trend that the milk on the basis of feed that contains soya concentrate performed slightly less well concerning the meat quality.

I claim:

1. Composition for the preparation of artificial calf milk, which composition in addition to carbohydrates, also contains lactoproteins, vegetable protein and fat, in amounts sufficient to produce an artificial calf milk characterized in that at least one part of the vegetable protein consists of soluble wheat protein.

2. Composition according to claim 1, characterized in that it contains 1 to 25 weight-% soluble wheat protein calculated on the total.

3. Composition according to claim 2, characterized in that it contains 8 to 20 weight-% soluble wheat protein calculated on the total.

4. Composition according to claim 3, characterized in that it contains 40 to 60 weight-% whey powder, 15 to 23 weight-% fat, 8 to 20 weight-% soluble wheat protein, 0.1 to 7 weight-% other protein, 1 to 13 weight-% added carbohydrates, 1 to 2 weight-% synthetic essential amino acids and 2.5 to 5 weight-% minerals and vitamins.

5. Composition according to claim 1, characterized in that it contains 5 to 90 weight-% soluble wheat protein calculated on the amount of protein.

6. Composition according to claim 1, characterized in that the lactoproteins are at least partially derived from whey powder.

7. Composition according to claim 6, characterized in that it contains 10 to 60 weight-% whey powder.

8. Composition according to claim 7, characterized in that it contains 40 to 60 weight-% whey powder.

9. Composition according to claim 1, characterized in that it contains 2 to 5 weight-% minerals and vitamins.

10. Composition according to claim 1, characterized in that it contains almost 15 to 23 weight-% fat.

11. Composition according to claim 1, characterized in that the wheat protein in the composition contains an average digestibility coefficient of between 94 and 98.

12. Composition according to claim 1, characterized in that the lactoprotein is at least partially derived from skimmed milk powder.

13. Composition according to claim 12, characterized in that it contains 0.1 to 60 weight-% skimmed milk powder.

14. Composition according to claim 1, characterized in that it contains 0.1 to 10 weight-% of another protein than lactoprotein and soluble wheat protein.

15. Composition according to claim 1, characterized in that it contains 0.1 to 13 weight-% added carbohydrates.

16. Composition according to claim 15, characterized in that it contains at least one of the substances, starch, dextrose and lactose as added carbohydrates.

17. Composition according to claim 1, characterized in that it contains between 0.1 to 3 weight-% synthetic essential amino acids.

18. Artificial calf milk consisting of an emulsion from the composition according to claim 1 in water.

19. Artificial calf milk according to claim 18, characterized in that it contains 125 to 175 grams of the composition per liter emulsion.

* * * * *